United States Patent
Wu et al.

(10) Patent No.: US 9,910,721 B2
(45) Date of Patent: Mar. 6, 2018

(54) SYSTEM AND METHOD FOR EXECUTION OF APPLICATION CODE COMPILED ACCORDING TO TWO INSTRUCTION SET ARCHITECTURES

(71) Applicant: Intel Corporation, Santa Clara, CA (US)

(72) Inventors: Yong Wu, Shanghai (CN); Xiao Dong Lin, Shanghai (CN); Yihua Jin, Shanghai (CN); Xueliang Zhong, Shanghai (CN); Jianhui Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 14/777,065

(22) PCT Filed: Dec. 9, 2014

(86) PCT No.: PCT/CN2014/093373
§ 371 (c)(1),
(2) Date: Sep. 15, 2015

(87) PCT Pub. No.: WO2016/090554
PCT Pub. Date: Jun. 16, 2016

(65) Prior Publication Data
US 2016/0364276 A1 Dec. 15, 2016

(51) Int. Cl.
*G06F 3/00* (2006.01)
*G06F 9/44* (2006.01)
(Continued)

(52) U.S. Cl.
CPC ............... *G06F 9/541* (2013.01); *G06F 8/41* (2013.01); *G06F 9/30145* (2013.01); *G06F 9/45533* (2013.01)

(58) Field of Classification Search
None
See application file for complete search history.

(56) References Cited

U.S. PATENT DOCUMENTS

2002/0083421 A1 6/2002 Simons
2008/0059769 A1 3/2008 Rymarczyk et al.
(Continued)

FOREIGN PATENT DOCUMENTS

CN 1494690 5/2004

OTHER PUBLICATIONS

International Search Report and Written Opinion dated Sep. 9, 2015 for International Application No. PCT/CN2014/093373, 12 pages.

*Primary Examiner* — Tuan Dao
*Assistant Examiner* — William C Wood
(74) *Attorney, Agent, or Firm* — Schwabe, Williamson & Wyatt, P.C.

(57) ABSTRACT

Methods, apparatuses and storage medium associated with execution of application code having multiple ISAs, are disclosed. In various embodiments, a runtime environment may execute application code having multiple instruction set architectures. The runtime environment may be configured to execute first code of the application code according to a first instruction set architecture, while also configured to execute second code of the application code according to a second instruction set architecture that extends the first instruction set architecture. Using gates, the runtime environment may be adapted to adapt an interaction from the first code to the second instruction set architecture and/or adapt an interaction from the second code to the first instruction set architecture and, subsequently, return to executing the application code according to the first instruction set architecture or the second instruction set architecture, respectively. Other embodiments may be disclosed or claimed.

21 Claims, 6 Drawing Sheets

(51) Int. Cl.
*G06F 9/46* (2006.01)
*G06F 13/00* (2006.01)
*G06F 9/54* (2006.01)
*G06F 9/45* (2006.01)
*G06F 9/30* (2018.01)
*G06F 9/455* (2018.01)

(56) References Cited

U.S. PATENT DOCUMENTS

| | | | | |
|---|---|---|---|---|
| 2010/0115513 | A1* | 5/2010 | Moriki | G06F 9/463 |
| | | | | 718/1 |
| 2011/0138473 | A1* | 6/2011 | Yee | G06F 21/53 |
| | | | | 726/26 |
| 2012/0159127 | A1* | 6/2012 | Spradlin | G06F 21/53 |
| | | | | 712/208 |
| 2013/0326489 | A1* | 12/2013 | Eijndhoven | G06F 9/45508 |
| | | | | 717/139 |
| 2014/0244983 | A1* | 8/2014 | McDonald | G06F 9/3005 |
| | | | | 712/225 |

* cited by examiner

Non-transitory computer-readable storage medium 600

Programming Instructions 602

FIG. 6

SYSTEM AND METHOD FOR EXECUTION OF APPLICATION CODE COMPILED ACCORDING TO TWO INSTRUCTION SET ARCHITECTURES

CROSS REFERENCE TO RELATED APPLICATIONS

The present application is a national phase entry under 35 U.S.C. § 371 of International Application No. PCT/CN2014/093373, filed Dec. 9, 2014, entitled "SYSTEM AND METHOD FOR EXECUTION OF APPLICATION CODE COMPILED ACCORDING TO TWO INSTRUCTION SET ARCHITECTURES", which designated, among the various States, the United States of America. The Specification of the PCT/CN2014/093373 Application is hereby fully incorporated by reference.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computing device may be characterized by its Instruction Set Architecture (ISA). Typically, a computing device may include Operating System (OS) services, and the OS services may include the runtime library services (LIB), developed for the ISA of the computing device, to facilitate application developers to develop applications to operate on the computing device. For example, various smartphones may be characterized by the use of the ARM processor and its ISA. These smartphones may include an OS, e.g., iOS from Apple® Computer or Android from Google®, in support of the various applications developed for the respective smartphones.

As central processing unit (CPU) architectures evolve, a computing device may include a CPU adapted to provide some new features—for example, IA-64 of the Intel® Processor Family may supply extra resources and capabilities (e.g., additional registers, register-based arguments, and instruction pointer relative addressing). However, the computing device may have stored therein a legacy application that may not be adapted to take advantage of the new features of the new CPU architecture. Traditionally, the legacy application would have to be recompiled according to a new ISA to take advantage of the new features, e.g., a 32-bit application may be recompiled to run in a 64-bit mode. However, recompilation of an entire application may be impractical. For example, even if recompiled to a 64-bit ISA, an application may rely on system libraries that have not been ported to the 64-bit ISA.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

Figure 1:
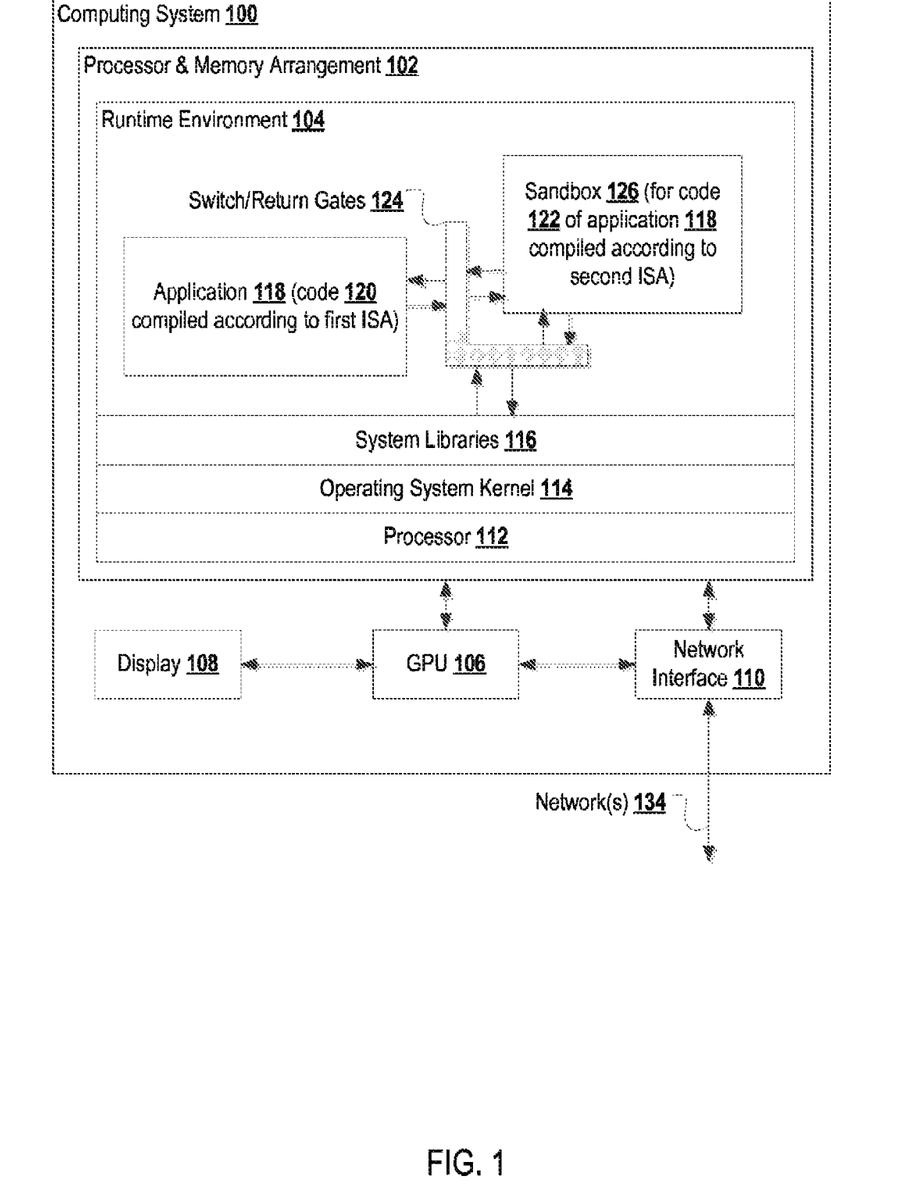
FIG. 1 is a block diagram illustrating computing system with a runtime environment having a sandbox for executing application code having multiple instruction set architectures, in accordance with various embodiments.

FIG. 1 illustrates an example computing system 100 incorporated with a runtime environment 104 having a sandbox 120 for executing application code having multiple ISAs, in accordance with various embodiments of the present disclosure. As shown, for the illustrated embodiments, the computing system 100 may include a processor and memory arrangement 102 configured to have at least one processor 112, an operating system (OS) kernel 114, a plurality of system libraries 116, a runtime environment 104, a graphics processing unit (GPU) 106, a display 108, and a network interface 110, coupled with each other as shown.

The computing system 100 may be a server, a desktop computer, a laptop computer, a tablet computer, a smartphone, a personal digital assistant, a game console, an Internet appliance, or other computing systems of the like. Examples of a computing system 100 may include, but are not limited to, the servers available from Hewlett Packard of Palo Alto, Calif., desktop or laptop computers available from Dell Computer of Austin, Tex., smartphones and computing tablets available from Apple Computer of Cupertino, Calif., game consoles available from Nintendo Corporation of Tokyo, Japan, and so forth.

The processor and memory arrangement 102 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth. In various embodiments, the CPU 106 may be configured to provide video decoding and/or graphics processing functions to the OS kernel 114, while the display 108 may be configured to enable content to be rendered thereon. Similarly, the CPU 106 and the display 108 are intended to represent a broad range of graphics processors and display elements known in the art. Likewise, one or more network(s) 134 is (are) intended to represent a broad range of networks known in the art. Examples of network(s) 134 may include wired or wireless, local or wide area, private or public networks, including the Internet.

The processor and memory arrangement 102 may include at least one processor 112. The processor 112 may comprise, for example, a CPU, a single or multi-core microprocessor, or the like. The processor 112 may be configured for one architecture while also supporting another architecture. For example, the processor 112 may be a 64-bit processor (e.g., IA-64) that supports 32-bit operations. Correspondingly, the OS kernel 114 may be configured for one architecture while also supporting another architecture—e.g., the OS kernel 114 may be a 64-bit kernel that supports 32-bit operations. The OS kernel 114 may additionally manage memory resources, schedule task execution, and so forth.

To support interaction with the underlying system, the processor and memory arrangement 102 may include a plurality of system libraries 116. The system libraries 116 may be configured to provide calls between an application 118 and the OS kernel 114. The system libraries 116 may also provide various platform operating functions such as file storage and input/output operations. At least one of the system libraries 116 may be compiled according to an ISA that is not configured to use all of the features of the architecture of the OS kernel 114 and/or the processor 112—that is, the OS kernel 114 and/or the processor 112 may be configured for an architecture that extends upon the architecture of the at least one of the system libraries 116. For example, at least one of the system libraries 116 may be a 32-bit library.

In embodiments, the processor and memory arrangement 102 may have loaded therein an application 118. The application 118 is intended to represent a broad range of applications known in the art. Examples of the application 118 may include, but are not limited to, personal assistant, productivity, or social networking applications, such as, calendar, word processing, spreadsheet, Twitter, Facebook, et al., or generic application agents, such as a browser.

In embodiments, the application 118 may comprise first code 120 that is compiled according to first ISA and second code 122 that is compiled according to a second ISA that extends the first ISA. In one embodiment, the first code 120 may be compiled according to a 32-bit ISA, whereas the second code 122 may be compiled according to a 64-bit ISA. During execution, the first code 120 may follow a first application binary interface (ABI) (e.g., a 32-bit ABI) as a result of compilation according to the first ISA, where the second code 122 may follow a different ABI (e.g., a 64-bit ABI) as a result of compilation according to the second ISA. Consequently, the first code 120 and the second code 122 of the application 118 may be unable to interact with one another when executed in one process and, therefore, unable to share data when executed in that process. For example, the data layout and/or alignment associated with the first code 120 in a 32-bit mode may differ from data layout and/or alignment associated with the second code 122 in a 64-bit mode because the pointer size for the 32-bit mode is four (4) bytes whereas the pointer size for the 64-bit mode is eight (8) bytes.

The processor and memory arrangement 102 may have loaded therein a runtime environment 104 for execution of the application 118 having multiple ISAs. In one embodiment, the runtime environment 104 may comprise a process virtual machine (PVM). The runtime environment 104 may separate the first code 120 and the second code 122 and may manage the interaction between the first code 120 and the second code 122. In connection with this separation, the runtime environment 104 may have a sandbox 126 for execution of the second code. The sandbox 126 may act as a virtual container so that operations of the second code 122 do not directly interact with other components (e.g., the first code 120 and/or the system libraries 116). Therefore, a process in which the application 118 executes may be configured for execution of first code 120 compiled according to a first ISA, but the second code 122 compiled according to a second ISA may be executed in that process within the sandbox 126. In connection with the sandbox 126, the runtime environment 104 may ensure that interactions the cause execution control of the application 118 to cross the sandbox 126 (e.g., between a 32-bit mode and a 64-bit mode) are well-handled.

In various embodiments, the runtime environment 104 may be configured to intercept an interaction during execution of the first code 120 or execution of the second code 122 that is to cause execution control of the application 118 to be transferred to the other mode (e.g., the other ISA and/or the other ISA ABI). For example, during execution of the first code 120, which may be associated with a 32-bit ISA, an interaction may cause execution control of the application 118 to be transferred to a 64-bit mode, such as the second code 122 which may be associated with a 64-bit ISA. Similarly, during execution of the second code 122, which may be associated with a 64-bit ISA, an interaction may cause execution control of the application 118 to be transferred to a 32-bit mode, such as the first code 120 which may be associated with a 32-bit ISA or a 32-bit system library of the system libraries 116.

In various embodiments, an interaction intercepted by the runtime environment 104 may be a call from the first code 120 to the second code 122, a call from the second code 122 to the first code 120, a call from the first code 120 to a library of the system libraries 116 compiled according to the second ISA, a call from the second code 120 to a library compiled according to the second ISA, or a signal associated with an OS kernel 114 that may be intercepted when execution control is transferred.

In one embodiment, a signal from the OS kernel 114 may interrupt the second code 122. Because the process in which the application 118 runs may be configured for that first ISA (e.g., 32-bit mode), registers associated with the first code 120 may be stored and/or restored by default in response to such an interrupt. However, the runtime environment 104 may be configured to store and/or restore registers associated with the second code 122, for example, when execution control of the application 118 is with the second code 122 in the sandbox 126.

The runtime environment 104 may be configured to adapt the intercepted interaction from the first ISA to the second ISA or from the second ISA to the first ISA, which may include adaption from a first ABI format associated with the first ISA to a second ABI format associated with the second ISA or adaption from the second ABI format to the first ABI format. To adapt the interaction, the runtime environment 104 may be adapted to insert a switch gate 124. Using the switch gate 124, execution control of the application 118 may be transferred from the first code 120 or the second code 122 (e.g., between a 32-bit mode and a 64-bit mode). Additionally, the runtime environment 104 may be adapted to insert a return gate 124. When execution control is to be returned to the first code 120 or the second code 122, the runtime environment may be configured to again transfer execution control (e.g., between a 64-bit mode and a 32-bit mode) using the return gate 124.

The runtime environment may inline the switch/return gates 124 into any code that may cause execution control to be transferred from the first code 120 or the second code 122 so that the first code 120 and the second code 122 may execute in the same process. In one embodiment, the runtime environment 104 may statically insert one or more gates 124, e.g., before execution of the application 118. In another embodiment, the runtime environment 104 may dynamically insert one or more gates 124, e.g., during execution of the application 118. In an embodiment in which the gates 124 are dynamically inserted, the runtime environment 104 may comprise a PALM.

For transfer of execution control from the first code 120 or the second code 122, the switch gate 124 in the runtime environment 104 may be configured, for example, to store one or more registers, adjust a size of data, adjust an alignment of data, adjust a layout of data, convert a call (e.g., a call associated with an application program interface (API) of the first code 120 or the second code 122, a call from the second code 122 to one of the system libraries 116 compiled according to the first ISA, etc.), store a signal associated with the OS kernel 114, and/or store a register. In one embodiment, the switch gate 124 may be configured to convert a call between a first ABI format associated with the first ISA and a second ABI format associated with the second ISA, and correspondingly the return gate 124 may be configured to return from the first or second ABI to the other of the first or second ABI.

After transfer of execution control from the first code 120 or the second code 122, one or more operations associated with the second ISA or the first ISA, respectively, and caused by the interaction may be executed. For example, the interaction may comprise a call from the first code 120 to a function of the second code 122 and the transfer of execution control may comprise execution of the callback function.

Subsequently, execution control may return to the first code 120 or the second code 122. The runtime environment 104 may use a return gate 124 to return execution control to the first code 120 or the second code 122. In various embodiments, the return gate 124 may be adapted to restore one or more registers, restore an adjustment to an alignment of data, restore an adjustment to a size of data, restore an adjustment to a layout of data, adapt a response (e.g., a result of a callback function) to a respective ISA associated with the first code 120 or the second code 122, and the like.

During execution of the application 118, the processor 112 may provide instructions that may jump to a segment associated with the first code 120 or a segment associated with the second code 122. The OS kernel 114 may create different segments for the first code 120 and the second code 122. Based on instructions from the processor 112 that are associated with one or more jumps and code segment descriptors provided by the OS kernel 114, the runtime environment 104 may insert a switch gate 124 and corresponding return gate 124 to transfer execution control to and from the first code 120 or the second code 122 (e.g., between a 32-bit mode and a 64-bit mode). Examples of the a jump between a segment associated with the first code 120 or a segment associated with the second code 122 are illustrated in Table 1 and Table 2 for an 32-bit ISA (e.g., x86 ISA) and 64-bit ISA (i.e., x64 ISA).

TABLE 1

| Example Switch/Return Gates 124 for 32-bit to 64-bit mode switch | Example Switch/Return Gates 124 for 64-bit to 32-bit mode switch |
| --- | --- |
| .code32<br>  ljmp USER_64_CS : code_64_addr<br>code_64_addr:<br>  .code64 | .code64<br>code_32_ptr:<br>  .long code_32_addr<br>  .word USER_32__CS<br>  lea code_32_ptr, reg<br>  ljmp *(reg)<br>code_32_addr:<br>  .code32 |

The pseudo-assembly illustrated in Table 1 is in the AT&T style (i.e., operation-code source, destination). In this example, "ljmp" is the FAR JUMP instruction provided by the processor 112. "USER_64_CS" is a 16-bit long code segment associated with the second code 122 (e.g., 64-bit code), which is provided by the OS kernel 114, while "USER_32_CS" is an 8-bit long code segment associated with the first code 120 (e.g., 32-bit code), also provided by the OS kernel 114. "code_64_addr" is a 64-bit address associated with an entry point of the second code 122 (e.g., transition of execution control to the second code 122 in the sandbox 126), whereas "code_32_addr" is a 32-bit address associated with an entry point of the first code 120 (e.g., transition of execution control to the first code 120). ".code32" and ".code64" are compiler pseudo-directives for the first code 120 and the second code 122, respectively.

TABLE 2

| Example Switch/Return Gates 124 for 32-bit to 64-bit mode switch (long code_64_addr) | Example Switch/Return Gates 124 for 64-bit to 32-bit mode switch (long code_32_addr) |
| --- | --- |
| .code32<br>push esi<br>push edi<br>lcall USER_64_CS : code_64<br>pop edi<br>pop esi<br>ret<br>.code64<br>code_64 :<br>  push rbp<br>  mov rsp, rbp<br>  PREPARE-ARGS<br>  call code_64_addr | .code64<br>push rbx<br>push rbp<br>lcall *code_32_ptr (%rip)<br>pop rbp<br>pop rbx<br>ret<br>.code64<br>code_32 :<br>  push ebp<br>  mov esp, ebp<br>  PREPARE-ARGS<br>  call code_32_addr |

TABLE 2-continued

| Example Switch/Return Gates 124 for 32-bit to 64-bit mode switch (long code_64_addr) | Example Switch/Return Gates 124 for 64-bit to 32-bit mode switch (long code_32_addr) |
|---|---|
| mov rbp, rsp<br>pop rbp<br>PREPARE-RES<br>lret | mov ebp, esp<br>PREPARE-RES<br>lret<br>code_32_ptr :<br>  .long code_32<br>  .word USER_32_CS |

Table 2 illustrates another example, which may use "far call" and a matching "far ret" for a jump. This implementation may provide improved automation on bookkeeping associated with performance of one or more jumps. "lcall" and "lret" may be instructions provided by the processor 112 to switch between the 64-bit mode and the 32-bit mode. "PREPARE-ARGS" is to handle the calling convention between the 32-bit mode and the 64-bit mode. For example, "PREPARE-ARGS" may copy arguments from the stack and to 64-bit registers (or vice versa), since the ABI format associated with the 64-bit ISA passes arguments by registers while the ABI format associated with the 32-bit ISA passes arguments by the stack. Similarly, "PREPARE-RES" may convert a return value, if necessary.

In one embodiment consistent with the example of Table 2, the switch/return gates 124 may be automated. The switch/return gates 124 may be provided as function calls to the first code 120 or the second code 122, with an input parameter for an address associated with the target function. The switch gate 12 may store registers associated with the callee code (e.g., the first code 120 or the second code 122) and call to the target function, and subsequently the return gate 124 may restore the registers and return to caller code (e.g., the other of the first code 120 or the second code 122).

In embodiments of the example switch/return gates 124 for 32-bit to 64-bit mode switch, "esi" and "edi" are 32-bit registers of the first code 120. These registers may not be saved during transfer of execution control from the first code 120. Therefore, the switch gate 124 may need to store the 32-bit registers, and the return gate 124 may restore the 32-bit registers after the far call. Similarly, in embodiments of the example switch/return gates 124 for 64-bit to 32-bit mode switch, "rbx" and "rbp" are 64-bit registers of the first code 120. These registers partially saved/restored when execution control transfers/returns from/to the second code 120. However, the switch gate 124 may store the 64-bit registers, and the return gate 124 may restore the 64-bit registers after the far call.

Figure 2:
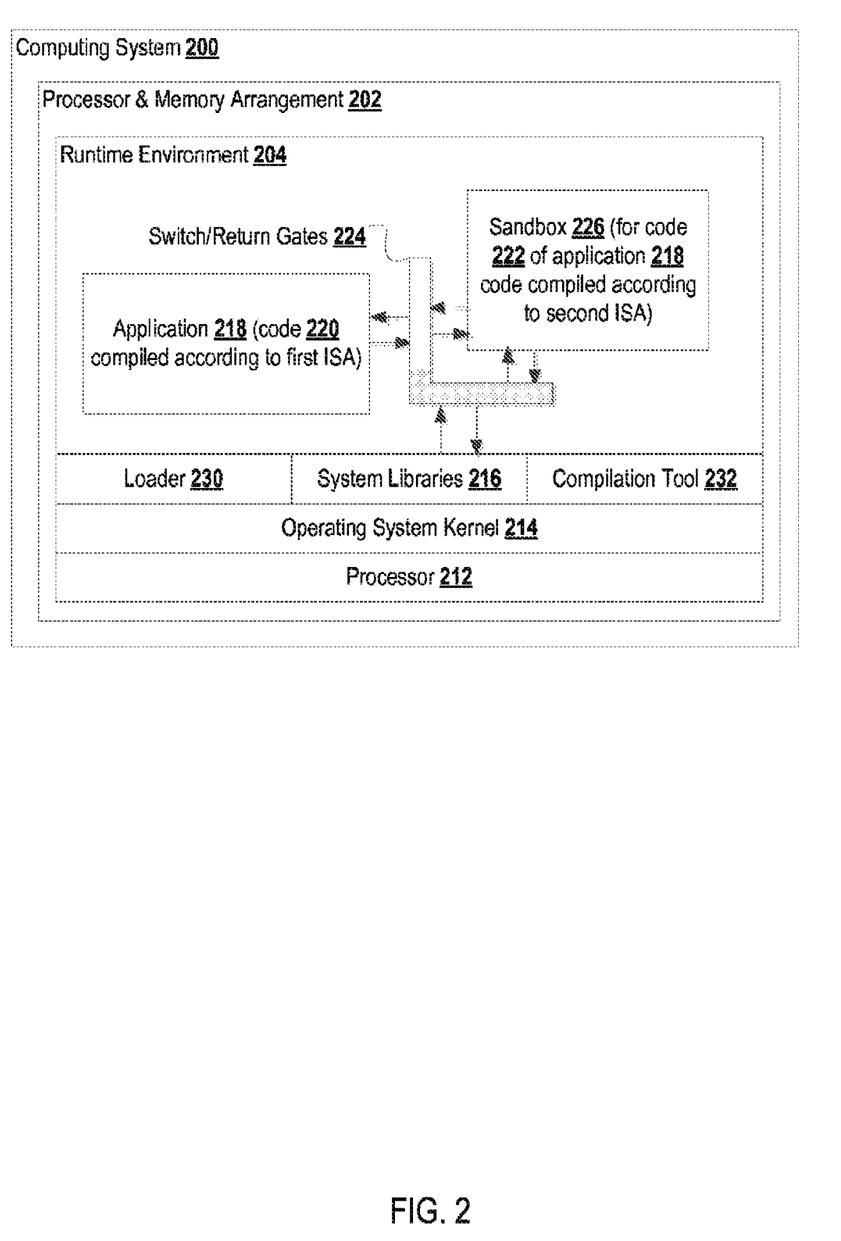
FIG. 2 is a block diagram illustrating computing system with a runtime environment, a loader, and a compilation tool for executing application code having multiple instruction set architectures, in accordance with various embodiments

Now with reference to FIG. 2, a block diagram illustrates an example computing system 200 incorporated with a runtime environment 204, a loader 230, and a compilation tool 232 for executing application code having multiple ISAs, in accordance with various embodiments of the present disclosure. In relation to embodiments described in FIG. 1, the computing system 200 may be an embodiment of the computing system 100, the processor and memory arrangement 202 may be an embodiment of the processor and memory arrangement 102, the runtime environment 204 may be an embodiment of the runtime environment 104, the processor 212 may be an embodiment of the processor 112, the OS kernel 214 may be an embodiment of the OS kernel 114, the system libraries 216 may be an embodiment of the system libraries 116, and/or the switch/return gates 224 may be embodiments of the switch/return gates 124. The runtime environment 204 may execute therein an application 218 having first code 220 and second code 222, which may be an embodiment of the application 118 having first code 120 and second code 122. The second code 222 may be executed in the runtime environment 204 in a sandbox 226, which may be an embodiment of the sandbox 126.

The OS kernel 214 may be associated with a system loader (not shown), which may be any conventional loader. The system loader may be responsible for loading the system libraries 216 into physical memory of the processor and memory configuration 204. The system loader may load the first code 220 of the application 218 into physical memory of the processor and memory configuration 204. In addition to the first code 220 comprising the application 218, the application 218 may be comprised of the second code 222 that is compiled according to an ISA that extends the ISA according to which the first code 220 is compiled—e.g., the first code 220 may be compiled according to a 32-bit ISA. Whereas the second code 222 may be compiled according to a 64-bit ISA. Therefore, the system loader may be insufficient to load the second code 222.

In addition to a system loader, the computing system 200 may include a loader 230 to load code, compiled according to a second ISA that extends a first ISA of the first code 220, into the physical memory of the processor and memory arrangement 202. In one embodiment, the loader 230 is configured to load a library associated with the second ISA (e.g., a library of the system libraries 216) into an address space associated with the first ISA. Further, the loader 230 may be adapted to link the first code 220 or the second code 222 with at least one of the switch/return gate 224. The loader 230 may be configured to resolve any unresolved symbolic names of application 118 associated with calling the system libraries 216 and/or addresses of the corresponding gates 224 associated with the system libraries 216.

The loader 230 may gain control of the loading from the system loader associated with the OS kernel 214 in any one of a number of known manners. Examples of such known manners may include the use of binary format based control transfer or load/pre-load variables when supported by OS kernel 214. In other embodiments, the system loader associated with the OS kernel 214 may be modified to facilitate the transfer of control to loader 230.

In embodiments, the computing system 200 may include a compilation tool 232. The compilation too may be configured to compile the second code 222 of the application 218 according to the second ISA that extends the first ISA. During compilation, the compilation tool 232 may be configured to follow an ABI that assumes encoding of the second ISA but follows data size and alignment of the first ISA. In one embodiment, the compilation tool 232 may be configured to compile one or more of the system libraries 216 according to the second ISA, but in a manner that avoid incompatible data layout and/or arrangement when the first code 220 interacts with the system libraries 216 compiled by the compilation tool 232.

Examples of compilers that may be similar to and/or included in the compilation tool 232 include compilers available from Intel Corporation of Santa Clara, Calif. that support x32 ABI, which assumes 64-bit encoding but follows 32-bit data size and alignment, and/or dynamic code generators that produce x32 code inside an x86 process. In embodiments, the compilation tool 232 may be invoked in any one of a number of known manners. In one embodiment, invocation of the application 218 (e.g., via user input) may correspondingly invoke the compilation tool 232. In one embodiment, the compilation tool 232 may comprise a dynamic just-in-time (JIT) engine for compilation.

In embodiments, the runtime environment 204 may comprise a PVM. The PVM 204 may be configured to operate according to the first ISA for the first code 220 (e.g., 32-bit ISA and associated ABI format). In such embodiments, the compilation tool 232 may be configured to generate just-in-time code (e.g., the second code 222 and/or system libraries 216) according to the second ISA (e.g., 64-bit ISA and associated ABI format). The PVM 204 may be configured to host the sandbox 226, which is to operate according to the second ISA, inside a process that follows the first ISA. The PVM 204 may be adapted to use various API mapping techniques to handle function calls and callbacks based on dynamic linking (e.g., calls to and/or from the first code 220 and/or the second code 222). In some embodiments, the PVM 204 may offer additional registers beyond those available to the first ISA and/or return instruction pointer (RIP) relative addressing. In one embodiment, the PVM 204 may be configured to fixedly map registers associated with the second ISA to the first ISA, which may reduce translation overhead associated with register allocation and/or register load.

The PVM 204 may be configured to insert the switch/return gates 224. In embodiments, the PVM 204 may interact with the loader 230 to locate exposed symbol information and link the first code 220 and/or the second code 222 with one or more switch/return gates 224 for transfer of execution control associated with different ISAs. In embodiments, the PVM 204 and/or the loader 230 may be unable to intercept one or more interactions during linking and/or loading; however, because the first code 220, the second code 222, and/or the system libraries 216 may be executed inside the PVM 204, the PVM 204 may have control over the interactions and may be configured to dynamically insert one or more switch/return gates 224 during execution. With respect to signals from the OS kernel 214, the PVM 204 may be configured to intercept one or more signals and switch between the first ISA and the second ISA in such a way that causes one or more register states to be stored in a signal handler. After signal handling, the PVM 204 may be configured to generate a "fake" signal frame according to the first ISA or second ISA and use a "sigreturn" according to the first SIA or the second ISA to return the one or more register states.

Figure 3:
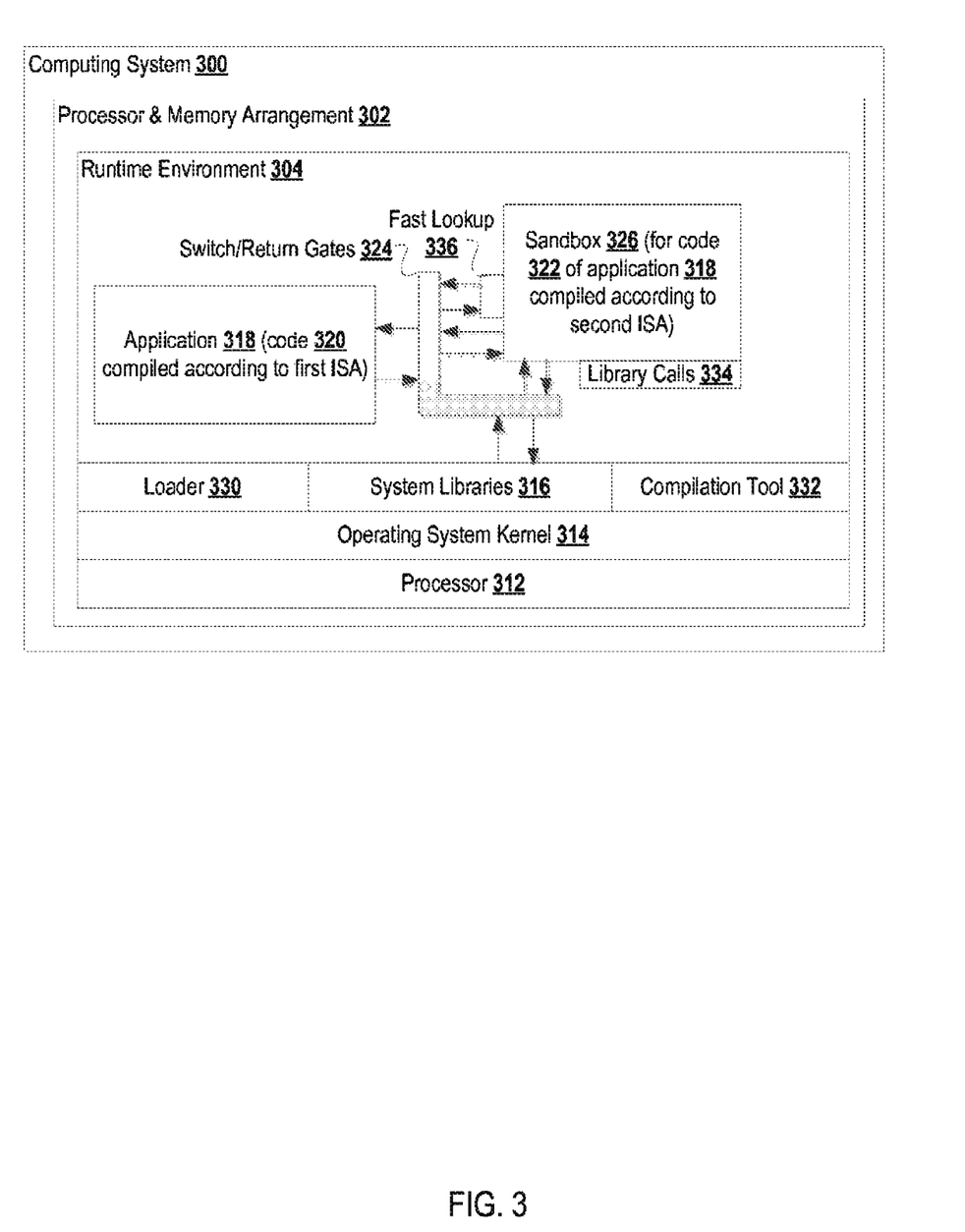
FIG. 3 is a block diagram illustrating computing system with a runtime environment having a fast lookup function and a library calls function for executing application code having multiple instruction set architectures, in accordance with various embodiments.

Turning to FIG. 3, a block diagram illustrates an example computing system 300 incorporated with a runtime environment 304 coupled with one or more library calls 334 and a fast lookup function 336 for executing application code having multiple ISAs, in accordance with various embodiments of the present disclosure. In relation to embodiments described in FIG. 1, the computing system 300 may be an embodiment of the computing system 100, the processor and memory arrangement 302 may be an embodiment of the processor and memory arrangement 102, the runtime environment 304 may be an embodiment of the runtime environment 104, the processor 312 may be an embodiment of the processor 112, the OS kernel 314 may be an embodiment of the OS kernel 114, the system libraries 316 may be an embodiment of the system libraries 116, and/or the switch/return gates 324 may be embodiments of the switch/return gates 124. The runtime environment 304 may execute therein an application 318 having first code 320 and second code 322, which may be an embodiment of the application 118 having first code 120 and second code 122. The second code 322 may be executed in the runtime environment 304 in a sandbox 326, which may be an embodiment of the sandbox 126.

While the runtime environment 304 may provide an approach to executing application code having multiple ISAs, switching between a first ISA (under which the first code 320 may be compiled) and a second ISA (under which the second code 322 may be compiled) using the switch/return gates 324 may incur some overhead. Therefore, one or more library calls 334 and/or a fast lookup function 336 may be incorporated with the teachings of the present disclosure to reduce overhead.

In embodiments, the runtime environment 304 may cause execution control of the application 318 to be transferred from the first code 320 or the second code 322 for translation lookup. To address this issue, the runtime environment 304 may be adapted to maintain one or more blocks of code in a fast lookup function 336. The one or more blocks of code may be associated with the first code 320 but compiled under the second ISA, or may be associated with the second code 322 but compiled under the first ISA. Thus, once a block of the first code 320 or the second code 322 is done executing, the forwarding thread may enter the fast lookup function 336 to identify the next block of code to be executed and, if the next block of code is successfully identified in the fast look-up function 336, continue execution of the application 318 using that identified block of code instead of switching between the first ISA and the second ISA.

In one embodiment, the runtime environment 304 may be adapted to identify a block of the first code 320 or the second code 322 that is to be executed a plurality of times and interact with the compilation tool 332 to cause that identified block of code to be converted to the other ISA, for example, by recompiling under the first ISA, if associated with the second ISA, or under the second ISA, if associated with the first ISA.

In embodiments, frequent API calling by the runtime environment 304 may cause execution control of the application 318 to be transferred from the first code 320 or the second code 322 and, therefore, API calling may increase overhead associated with execution of the application 318. In particular, some function calls from the second code 322 may be to system libraries 316 compiled according to the first ISA. To reduce overhead, the runtime environment 304 may be configured to recompile one or more system libraries 316, originally compiled according to the first ISA, to be compiled according to the second ISA, for example, by causing the compilation tool 332 to recompile the one or more system libraries 316. These recompiled system libraries may be maintained in a library calls function 334 that is accessible during execution of the second code 322 in the sandbox 326. Therefore, when the second code 322 is executing, runtime environment 304 may access the library calls function 334 instead of using switch/return gates 324 to exit the sandbox 326 and interact with the system libraries 316.

Figure 4:
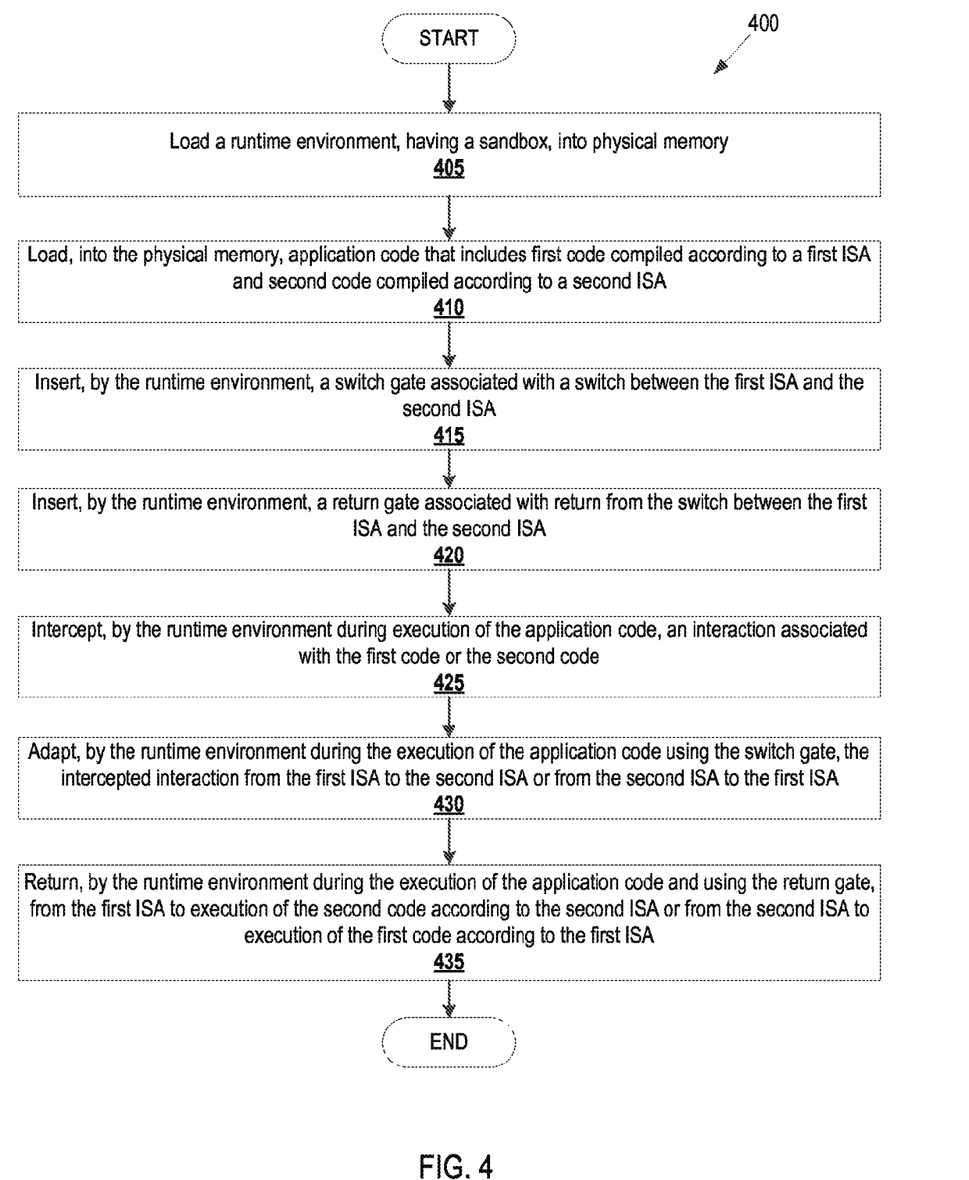
FIG. 4 is a flow diagram illustrating a method for executing application code having multiple instruction set architectures, in accordance with various embodiments.

Referring now to FIG. 4, a flow diagram illustrates a method 400 for executing an application having multiples ISAs, in accordance with various embodiments of the present disclosure. The method 400 may be practiced in one or more computing systems described in the present disclosure, such as the computing system 100 of FIG. 1. While the method 400 illustrates a plurality of sequential operations, one of ordinary skill would recognize that one or more operations of the method 400 may be omitted and/or transposed.

Beginning with operation 405, the method 400 may include loading, e.g., by a loader of an operating system, a runtime environment into physical (or virtual) memory. In embodiments, the runtime environment may be configured to execute application code according to a first ISA, but may include a sandbox for execution of application code according to a second ISA that extends the first ISA. Operation 410 may include loading, e.g., by a loader of an operating system, into the physical (or virtual) memory, application code that includes first code compiled according to the first ISA and second code compiled according to the second ISA. In embodiments, the second code may be loaded to be executed in the sandbox of the runtime environment. At operation 415, the method 400 may include inserting, by the runtime environment, a switch gate associated with a switch between the first ISA and the second ISA. Correspondingly, operation 420 may include, inserting, by the runtime environment, a return gate associated with return from the switch between the first ISA and the second ISA. In various embodiments, operations 415 and 420 may be performed statically or dynamically.

During execution of the application code, operation 425 may comprise intercepting, by the runtime environment, an interaction associated with the first code or the second code, such as a call to and/or from the first code and/or the second code or a signal that is to interrupt the first code and/or the second code. Still during execution of the application code, operation 430 may include adapting, by the runtime environment, the intercepted interaction from the first ISA to the second ISA or from the second ISA to the first ISA. The adapting of operation 430 may be dependent whether the application code is at a point of executing the first code or the second code—e.g., if the interaction is from the first code to the second code, as a function call from the first code to the second code, the interaction may be adapted from the first ISA to the second ISA. Operations associated with the interaction (e.g., execution of a callback function) may be performed. In further execution of the application code, operation 435 may comprise returning, by the runtime environment and using the inserted return gate, from the first ISA to executing the application code according to the second ISA, if the switching was from the second ISA to the first ISA, or returning from the second ISA to executing the application code according to the first ISA, if the switching was from the first ISA to the second ISA.

Figure 5:
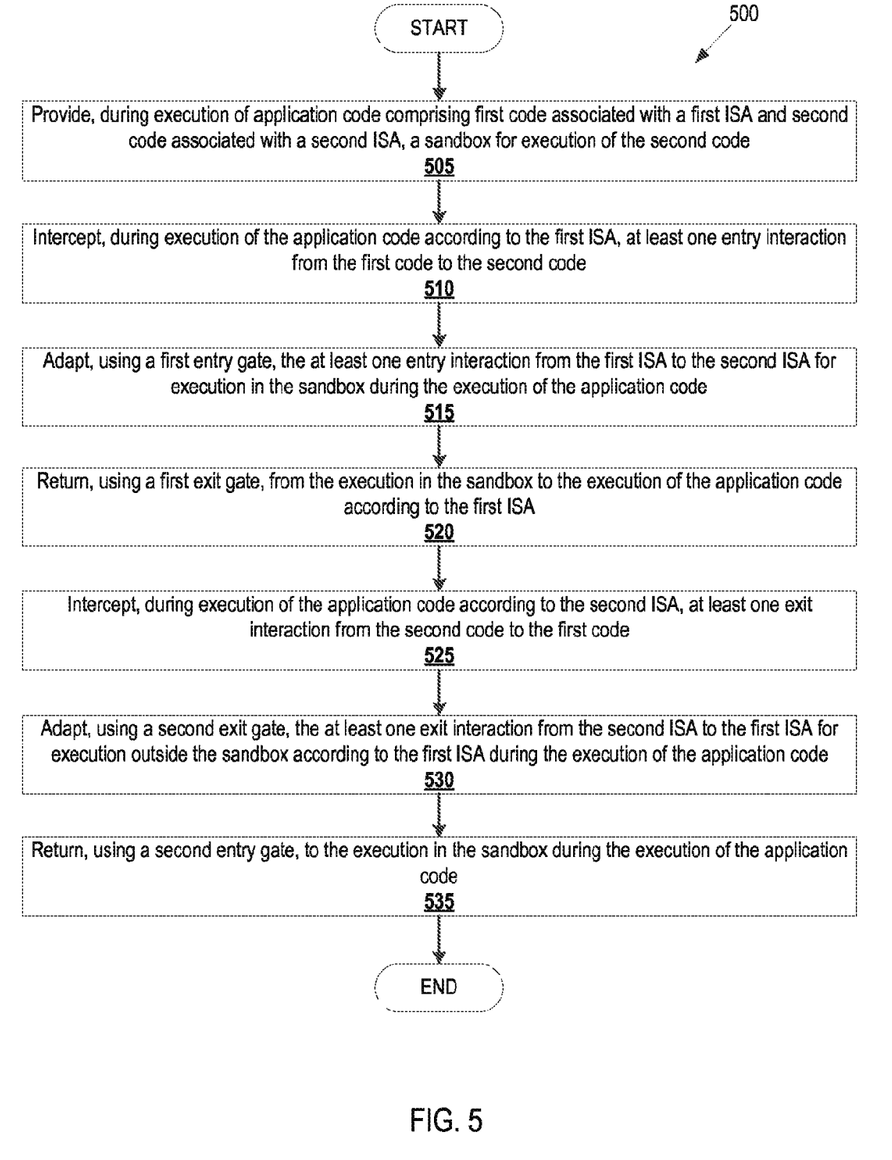
FIG. 5 is a flow diagram illustrating another method for executing application code having multiple instruction set architectures, in accordance with various embodiments.

Referring now to FIG. 5, a flow diagram illustrates another method 500 for executing an application having multiple ISAs, in accordance with various embodiments of the present disclosure. The method 500 may be practiced in one or more computing systems described in the present disclosure, such as the computing system 100 of FIG. 1. While the method 500 illustrates a plurality of sequential operations, one of ordinary skill would recognize that one or more operations of the method 400 may be omitted and/or transposed.

The method 500 may begin with an operation 505 for providing (e.g., by a runtime environment) a sandbox for execution of application code. In embodiments, the application code may comprise first code compiled according to first ISA and second code compiled according to a second ISA that extends the first ISA. Because the first code and the second code may be unable to satisfactorily interact during execution, the sandbox may be provided for segregated execution of the second code from the first code. During execution of the application code according to the first ISA, operation 510 may include intercepting (e.g., by the sandbox) at least one interaction that is to cause entry (e.g., transfer of execution control) from the first code to the second code. Operation 515 may include adapting (e.g., by the sandbox), using a first entry gate, the at least one entry interaction from the first ISA to the second ISA for execution in the sandbox during execution of the application code. Operations associated with the at least one interaction may thereafter be performed in the sandbox. Subsequently, operation 520 may comprise returning (e.g., by the sandbox), using a first exit gate, from execution of the application code in the sandbox to execution of the application code according to the first ISA.

In embodiments, the method 500 may further include operations 525-535. During execution of the application code according to the second ISA, operation 525 may include intercepting (e.g., by the sandbox) at least one interaction that is to cause exit (e.g., transfer of execution control) from the second code, executing in the sandbox, to the first code. Operation 530 may include adapting (e.g., by the sandbox), using a second exit gate, the at least one exit interaction from the second ISA to the first ISA for execution outside the sandbox according to the first ISA during execution of the application code. Operations associated with the at least one interaction may thereafter be performed according to the first ISA. Subsequently, operation 535 may comprise returning (e.g., by the sandbox), using a first entry gate, from execution of the application code according to the first ISA to execution of the application code in the sandbox according to the second ISA.

Figure 6:
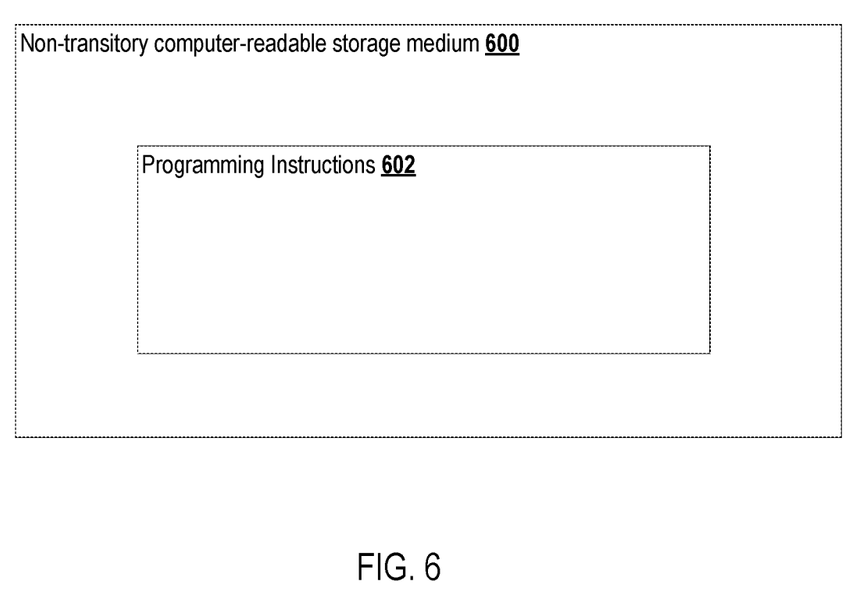
FIG. 6 illustrates an example non-transitory computer-readable storage medium having instructions configured to practice all or selected aspects of the embodiments of the present disclosure.

FIG. 6 illustrates an example non-transitory computer-readable storage medium having instructions configured to practice all or selected aspects of the method of FIGS. 4 and/or 5, in accordance with various embodiments of the present disclosure. As illustrated, non-transitory computer-readable storage medium 602 may include a number of programming instructions 604. Programming instructions 604 may be configured to enable a computing system, e.g. computing device 100, in response to execution of the programming instructions, to perform all or selected aspects of a runtime environment operations of method 400 earlier described with reference to FIG. 4 and/or operations of method 500 earlier described with reference to FIG. 5. Referring back to FIG. 1, programming instructions 604 may be configured to enable a computing system to perform all of selected features described with respect to the runtime environment 104. Referring back to FIG. 2, programming instructions 604 may be configured to enable a computing system to perform all of selected features described with respect to the loader 230 and/or the compilation tool 232. In alternate embodiments, programming instructions 604 may be disposed on multiple non-transitory computer-readable storage media 602.

In various embodiments, example 1 may be an apparatus for executing application code having multiple instruction set architectures, the apparatus comprising: one or more processors; physical memory, coupled with the one or more processors, and configured to store application code to be loaded into the physical memory for execution by the one or more processors, including first code compiled according to a first instruction set architecture and second code compiled according a second extended instruction set architecture of the first instruction set architecture; and a runtime environment, having a sandbox for execution of the second code, to be loaded into the physical memory and operated by the one or more processors, to: insert a switch gate associated with a switch between the first and second instruction set architectures; intercept, during execution of the application code, an interaction associated with the first code or the second code; and adapt, during the execution of the application code and using the switch gate, the intercepted interaction from the first instruction set architecture to the second instruction set architecture or from the second instruction set architecture to the first instruction set architecture. Example 2 may include the apparatus of example 1, wherein the runtime environment is further to: insert a return gate associated with return from the switch between the first instruction set architecture and the second instruction set architecture; and return, during the execution of the application code and using the return gate, from the first instruction set architecture to the execution of the second code according to the second instruction set architecture or from the second instruction set architecture to execution of the first code according to the first instruction set architecture. Example 3 may include the apparatus of example 2, wherein the runtime environment is to adapt the intercepted interaction via at least one of an adjustment to a size of data associated with the interaction, an adjustment to an alignment of data associated with the interaction, or storage of at least one state of at least one register associated with the interaction, and wherein the runtime environment is to return via at least one of a restoration of the adjustment to the size, a restoration of the adjustment to the alignment, or a restoration of the at least one state of the at least one register from the storage. Example 4 may include the apparatus of example 2, wherein the runtime environment is to adapt the intercepted interaction via a conversion of a call from a first application binary interface associated with the first instruction set architecture to a second application binary interface associated with the second instruction set architecture or from the second application binary interface to the first application binary interface, and wherein the runtime environment is to return via return to the second application binary interface from the first application binary interface or return to the first application binary interface from the first application binary interface. Example 5 may include the apparatus of example 2, further comprising: a loader, to be loaded into the physical memory to cooperate with the runtime environment, to load a library associated with the second instruction set architecture into an address space associated with the first instruction set architecture and to link the application code with at least one of the switch gate or the return gate. Example 6 may include the apparatus of example 1, wherein the interaction comprises at least one of a call from the first code to the second code, a call from the second code to the first code, a call from the first code to a library compiled according to the second instruction set architecture, a call from the second code to a library compiled according to the first instruction set architecture, or a signal associated with an operating system kernel of the apparatus. Example 7 may include the apparatus of any of examples 1-6, wherein the first instruction set architecture comprises a thirty-two-bit instruction set architecture and the second instruction set architecture comprises a sixty-four-bit instruction set architecture. Example 8 may include the apparatus of any of examples 1-6, further comprising: a compilation tool, to be loaded into the physical memory and operated by the one or more processors, to compile the second code according to the second instruction set architecture. Wherein the compilation tool, during compilation, follows an application binary interface that assumes encoding of the second instruction set architecture but follows data size and alignment of the first instruction set architecture. Example 9 may include the apparatus of example 8, wherein the runtime environment comprises a process virtual machine associated with the execution of the application code to dynamically insert the switch gate, and wherein the compilation tool comprises a dynamic just-in-time engine for compilation. Example 10 may include the apparatus of example 8, wherein the runtime environment is to cause at least one system library compiled according to the second instruction set architecture to be recompiled according to the first instruction set architecture, and wherein the runtime environment is further to: identify a block of the application code that is to be executed a plurality of times; convert the block to the second instruction set architecture, if compiled under the first instruction set architecture, or to the first instruction set architecture, if compiled under the second instruction set architecture to facilitate fast lookup by the runtime environment associated with the interception of the interaction. Example 11 may include the apparatus of any of examples 1-6, wherein the application code is to be loaded into the physical memory and operated by the one or more processors.

In various embodiments, example 12 may be one or more non-transitory computer-readable media comprising computing device-executable instructions, wherein the instructions, in response to execution by a computing system, provide the computing system with a sandbox environment to manage execution of an application having multiple instruction set architectures, the sandbox environment to: provide, during execution of application code comprising first code associated with a first instruction set architecture and second code associated with a second instruction set architecture, a sandbox for execution of the second code associated with the second instruction set architecture; intercept, during execution of the application code according to the first instruction set architecture, at least one entry interaction from the first code to the second code; adapt, using a first entry gate, the at least one entry interaction from the first instruction set architecture to the second instruction set architecture for execution in the sandbox during the execution of the application code; and return, using a first exit gate, from the execution in the sandbox to the execution of the application code according to the first instruction set architecture. Example 13 may include the one or more non-transitory computer-readable media of example 12, wherein the instructions further cause the computing system to: intercept, during execution of the application code according to the second instruction set architecture, at least one exit interaction from the second code to the first code; adapt, using a second exit gate, the at least one exit interaction from the second code to the first code for execution outside the sandbox according to the first instruction set architecture during the execution of the application code; and return, using a second entry gate, to the execution in the sandbox during the execution of the application code. Example 14 may include the one or more non-transitory computer-readable media of example 12, wherein the adaption using the first entry gate comprises at least one of an adjustment to a size of data associated with the entry interaction, an adjustment to an alignment of data associated with the entry interaction, or storage of at least one state of at least one register associated with the entry interaction. Example 15 may include the one or more non-transitory computer-readable media of example 12, wherein the instructions further cause the computing system to: load a library associated with the second instruction set architecture into an address space associated with the first instruction set architecture and to link the application code with at least one of the first entry gate or the first exit gate. Example 16 may include the one or more non-transitory computer-readable media of example 12, wherein the first instruction set architecture comprises a thirty-two-bit instruction set architecture and the second instruction set architecture comprises a sixty-four-bit instruction set architecture. Example 17 may include the one or more non-transitory computer-readable media of example 12, wherein the entry interaction comprises at least one of a call to a first part of the application code compiled according to the second instruction set architecture, a call to a library compiled according to the second instruction set architecture, or a signal associated with an operating system kernel of the computing system. Example 18 may include the one or more non-transitory computer-readable media of any of examples 12-17, wherein the instructions further cause the computing system to: compile the second code according to the second instruction set architecture based on an application binary interface that assumes encoding of the second instruction set architecture but follows data size and alignment of the first instruction set architecture. Example 19 may include the one or more non-transitory computer-readable media of example 18, wherein the execution of the application code is associated with a process virtual machine that is to dynamically insert at least one of the first entry gate or the first exit gate. Example 20 may include the one or more non-transitory computer-readable media of example 18 wherein the instructions further cause the computing system to: identify a block of the application code that is to be executed a plurality of times; and convert the block to the second instruction set architecture, if compiled according to first instruction set architecture, or to the first instruction set architecture, if compiled according to the second instruction set architecture, to facilitate fast lookup associated with the interception of the entry interaction or interception of an exit interaction from the second code to the first code.

In various embodiments, example 21 may be a computer-implemented method for executing applications with multiple instruction set architectures, the method comprising: executing, in a process, first code associated with a first instruction set architecture and a sandbox; executing, in the sandbox, second code associated with a second instruction set architecture; intercepting, during the executing of the first code, at least one interaction from the first code to the second code; adapting, using first gate, the at least one interaction from the first instruction set architecture to the second instruction set architecture; executing, in the sandbox, at least a part of the second code based on the adapting of the at least one interaction; and exiting, using a second gate, the sandbox after the executing the at least a part of the second code. Example 22 may include the computer-implemented method of example 21, wherein the adapting using the first gate comprises at least one of an adjustment to a size of data associated with the interaction, an adjustment to an alignment of data associated with the interaction, or storage of at least one state of at least one register associated with the interaction. Example 23 may include the computer-implemented method of example 21, wherein the interaction comprises at least one of a call to the second code, a call to a library compiled according to the second instruction set architecture, or a signal associated with an operating system kernel. Example 24 may include the computer-implemented method of any of examples 21-23, further comprising: compiling the second code according to the second instruction set architecture based on an application binary interface that assumes encoding of the second instruction set architecture but follows data size and alignment of the first instruction set architecture. Example 25 may include the computer-implemented method of any of examples 21-23, further comprising: compiling at least one system library earlier compiled according to the first instruction set architecture according to the second instruction set architecture. Example 26 may include the computer-implemented method of any of examples 21-23, further comprising: intercepting, during the executing of the second code, another interaction, the other interaction from the second code to the first code; adapting, using a third gate, the other interaction from the second instruction set architecture to the first instruction set architecture; executing, outside the sandbox, at least a part of the first code based on the adapting of the other interaction; and returning, using a fourth gate, to the executing of the second code inside the sandbox after the executing the at least a part of the first code.

In various embodiments, example 27 may be one or more non-transitory computer-readable media comprising computing device-executable instructions, wherein the instructions, in response to execution by a computing system, cause the computing system to perform the method of any of examples 21-23.

In various embodiments, example 28 may be an apparatus for executing applications with multiple instruction set architectures, the apparatus comprising: means for executing, in a process, first code associated with a first instruction set architecture and a sandbox; means for executing, in the sandbox, second code associated with a second instruction set architecture; means for intercepting, during the executing of the first code, at least one interaction from the first code to the second code; means for adapting, using a first gate, the at least one interaction from the first instruction set architecture to the second instruction set architecture; means for executing, in the sandbox, at least a part of the second code based on the adapting of the at least one interaction; and means for exiting, using a second gate, the sandbox after the executing the at least a part of the second code. Example 29 may include the apparatus of example 28, wherein the means for adapting using the first gate comprises means for at least one of adjusting a size of data associated with the interaction, adjusting an alignment of data associated with the interaction, or storing at least one state of at least one register associated with the interaction. Example 30 may include the apparatus of example 28, wherein the interaction comprises at least one of a call to the second code, a call to a library compiled according to the second instruction set architecture, or a signal associated with an operating system kernel. Example 31 may include the apparatus of any of examples 28-30, further comprising: means for compiling the second code according to the second instruction set architecture based on an application binary interface that assumes encoding of the second instruction set architecture but follows data size and alignment of the first instruction set architecture. Example 32 may include the apparatus of any of examples 28-30, further comprising: means for compiling at least one system library earlier compiled according to the first instruction set architecture according to the second instruction set architecture. Example 33 may include the apparatus of any of examples 28-30, further comprising: means for identifying a block of the first code or the second code that is to be executed a plurality of times; and means for converting the block to the second instruction set architecture, if compiled under the first instruction set architecture, or to the first instruction set architecture, if compiled under the second instruction set architecture to facilitate fast lookup associated with the intercepting of the interaction. Example 34 may include the apparatus of any of examples 28-30, further comprising: means for intercepting, during the executing of the second code, another interaction, the other interaction from the second code to the first code; means for adapting, using a third gate, the other interaction from the second instruction set architecture to the first instruction set architecture; means for executing, outside the sandbox, at least a part of the first code based on the adapting of the other interaction; and means for returning, using a fourth gate, to the executing of the second code inside the sandbox after the executing the at least a part of the first code.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine—(e.g., a computer-) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus for executing application code having multiple instruction set architectures, the apparatus comprising:
one or more processors;
physical memory, coupled with the one or more processors, to store application code to be loaded into the physical memory for execution by the one or more processors, including first code compiled according to a first instruction set architecture and second code compiled according a second extended instruction set architecture of the first instruction set architecture; and
a runtime environment, to be loaded into the physical memory and operated by the one or more processors, to:
insert a switch gate associated with a switch between the first and second instruction set architectures;
insert a return gate associated with return from the switch between the first instruction set architecture and the second instruction set architecture;
intercept, during execution of the application code, an interaction associated with the first code or the second code; and
adapt, during the execution of the application code and using the switch gate, the intercepted interaction to switch from the first instruction set architecture to the second instruction set architecture or from the second instruction set architecture to the first instruction set architecture;
wherein the runtime environment is to adapt the intercepted interaction via a conversion of a call from a first application binary interface associated with the first instruction set architecture to a second application binary interface associated with the second instruction set architecture or from the second application binary interface to the first application binary interface, and
wherein the runtime environment is to return to the second application binary interface from the first application binary interface or return to the first application binary interface from the second application binary interface.

2. The apparatus of claim 1, wherein the interaction comprises at least one of a call from the first code to the second code, a call from the second code to the first code, a call from the first code to a library compiled according to the second instruction set architecture, a call from the second code to a library compiled according to the first instruction set architecture, or a signal associated with an operating system kernel of the apparatus.

3. The apparatus of claim 1, wherein the first instruction set architecture comprises a thirty-two-bit instruction set architecture and the second instruction set architecture comprises a sixty-four-bit instruction set architecture.

4. An apparatus for executing application code having multiple instruction set architectures, the apparatus comprising:
one or more processors;
physical memory, coupled with the one or more processors, to store application code to be loaded into the physical memory for execution by the one or more processors, including first code compiled according to a first instruction set architecture and second code compiled according a second extended instruction set architecture of the first instruction set architecture; and
a runtime environment, to be loaded into the physical memory and operated by the one or more processors, to:
insert a switch gate associated with a switch between the first and second instruction set architectures;

insert a return gate associated with return from the switch between the first instruction set architecture and the second instruction set architecture;

intercept, during execution of the application code, an interaction associated with the first code or the second code; and adapt, during the execution of the application code and using the switch gate, the intercepted interaction to switch from the first instruction set architecture to the second instruction set architecture or from the second instruction set architecture to the first instruction set architecture;

wherein the runtime environment is to adapt the intercepted interaction via at least one of an adjustment to a size of data associated with the interaction, or an adjustment to an alignment of data associated with the interaction, and wherein the runtime environment is to return via at least one of a restoration of the adjustment to the size, or a restoration of the adjustment to the alignment.

5. The apparatus of claim 4, further comprising:

a loader, to be loaded into the physical memory to cooperate with the runtime environment, to load a library associated with the second instruction set architecture into an address space associated with the first instruction set architecture and to link the application code with at least one of the switch gate or the return gate.

6. An apparatus for executing application code having multiple instruction set architectures, the apparatus comprising:

one or more processors;

physical memory, coupled with the one or more processors, to store application code to be loaded into the physical memory for execution by the one or more processors, including first code compiled according to a first instruction set architecture and second code compiled according a second extended instruction set architecture of the first instruction set architecture; and a runtime environment, to be loaded into the physical memory and operated by the one or more processors, to:

insert a switch gate associated with a switch between the first and second instruction set architectures;

insert a return gate associated with return from the switch between the first instruction set architecture and the second instruction set architecture;

intercept, during execution of the application code, an interaction associated with the first code or the second code; and adapt, during the execution of the application code and using the switch gate, the intercepted interaction to switch from the first instruction set architecture to the second instruction set architecture or from the second instruction set architecture to the first instruction set architecture;

a compilation tool, to be loaded into the physical memory and operated by the one or more processors, to compile the second code according to the second instruction set architecture, wherein the compilation tool, during compilation, follows an application binary interface that assumes encoding of the second instruction set architecture but follows data size and alignment of the first instruction set architecture.

7. The apparatus of claim 6, wherein the runtime environment comprises a process virtual machine associated with the execution of the application code to dynamically insert the switch gate, and wherein the compilation tool comprises a dynamic just-in-time engine for compilation.

8. The apparatus of claim 6, wherein the runtime environment is to cause at least one system library compiled according to the second instruction set architecture to be recompiled according to the first instruction set architecture, and wherein the runtime environment is further to:

identify a block of the application code that is to be executed a plurality of times;

convert the block to the second instruction set architecture, if compiled under the first instruction set architecture, or to the first instruction set architecture, if compiled under the second instruction set architecture to facilitate fast lookup by the runtime environment associated with the interception of the interaction.

9. The apparatus of claim 6, wherein the application code is to be loaded into the physical memory and operated by the one or more processors.

10. A computer-implemented method for executing applications with multiple instruction set architectures, the method comprising:

executing, in a process, first code associated with a first instruction set architecture and a sandbox;

executing, in the sandbox, second code associated with a second instruction set architecture;

intercepting, during the executing of the first code, at least one interaction from the first code to the second code;

adapting, using a first gate, the at least one interaction to switch from the first instruction set architecture to the second instruction set architecture;

executing, in the sandbox, at least a part of the second code based on the adapting of the at least one interaction; and exiting, using a second gate, the sandbox after the executing the at least a part of the second code;

wherein compiling the second code according to the second instruction set architecture based on an application binary interface that assumes encoding of the second instruction set architecture but follows data size and alignment of the first instruction set architecture.

11. The computer-implemented method of claim 10, wherein the adapting using the first gate comprises at least one of an adjustment to a size of data associated with the interaction, an adjustment to an alignment of data associated with the interaction, or storage of at least one state of at least one register associated with the interaction.

12. The computer-implemented method of claim 10, wherein the interaction comprises at least one of a call to the second code, a call to a library compiled according to the second instruction set architecture, or a signal associated with an operating system kernel.

13. The computer-implemented method of claim 10, further comprising:

compiling at least one system library earlier compiled according to the first instruction set architecture according to the second instruction set architecture.

14. One or more non-transitory computer-readable media comprising computing device-executable instructions, wherein the instructions, in response to execution by a computing system, provide the computing system with a sandbox environment to manage execution of an application having multiple instruction set architectures, the sandbox environment to:

provide, during execution of application code comprising first code associated with a first instruction set architecture and second code associated with a second instruction set architecture, a sandbox for execution of the second code associated with the second instruction set architecture;

intercept, during execution of the application code according to the first instruction set architecture, at least one entry interaction from the first code to the second code;

adapt, using a first entry gate, the at least one entry interaction to switch from the first instruction set architecture to the second instruction set architecture for execution in the sandbox during the execution of the application code; and return, using a first exit gate, from the execution in the sandbox to the execution of the application code according to the first instruction set architecture;

wherein the computing system is further caused to load a library associated with the second instruction set architecture into an address space associated with the first instruction set architecture and to link the application code with at least one of the first entry gate or the first exit gate.

15. The one or more non-transitory computer-readable media of claim 14, wherein the instructions further cause the computing system to:

intercept, during execution of the application code according to the second instruction set architecture, at least one exit interaction from the second code to the first code;

adapt, using a second exit gate, the at least one exit interaction from the second code to the first code for execution outside the sandbox according to the first instruction set architecture during the execution of the application code; and return, using a second entry gate, to the execution in the sandbox during the execution of the application code.

16. The one or more non-transitory computer-readable media of claim 14, wherein the adaption using the first entry gate comprises at least one of an adjustment to a size of data associated with the entry interaction, an adjustment to an alignment of data associated with the entry interaction, or storage of at least one state of at least one register associated with the entry interaction.

17. The one or more non-transitory computer-readable media of claim 14, wherein the first instruction set architecture comprises a thirty-two-bit instruction set architecture and the second instruction set architecture comprises a sixty-four-bit instruction set architecture.

18. The one or more non-transitory computer-readable media of claim 14, wherein the entry interaction comprises at least one of a call to a first part of the application code compiled according to the second instruction set architecture, a call to a library compiled according to the second instruction set architecture, or a signal associated with an operating system kernel of the computing system.

19. One or more non-transitory computer-readable media comprising computing device-executable instructions, wherein the instructions, in response to execution by a computing system, provide the computing system with an environment to manage execution of an application having multiple instruction set architectures, the environment to:

provide, during execution of application code comprising first code associated with a first instruction set architecture and second code associated with a second instruction set architecture, a sandbox for execution of the second code associated with the second instruction set architecture;

intercept, during execution of the application code according to the first instruction set architecture, at least one entry interaction from the first code to the second code;

adapt, using a first entry gate, the at least one entry interaction to switch from the first instruction set architecture to the second instruction set architecture for execution in the sandbox during the execution of the application code; and return, using a first exit gate, from the execution in the sandbox to the execution of the application code according to the first instruction set architecture;

wherein the instructions further cause the computing system to:

compile the second code according to the second instruction set architecture based on an application binary interface that assumes encoding of the second instruction set architecture but follows data size and alignment of the first instruction set architecture.

20. The one or more non-transitory computer-readable media of claim 19, wherein the execution of the application code is associated with a process virtual machine that is to dynamically insert at least one of the first entry gate or the first exit gate.

21. The one or more non-transitory computer-readable media of claim 19 wherein the instructions further cause the computing system to:

identify a block of the application code that is to be executed a plurality of times; and convert the block to the second instruction set architecture, if compiled according to the first instruction set architecture, or to the first instruction set architecture, if compiled according to the second instruction set architecture, to facilitate fast lookup associated with the interception of the entry interaction or interception of an exit interaction from the second code to the first code.

* * * * *

UNITED STATES PATENT AND TRADEMARK OFFICE
CERTIFICATE OF CORRECTION

PATENT NO. : 9,910,721 B2  
APPLICATION NO. : 14/777065  
DATED : March 6, 2018  
INVENTOR(S) : Yong Wu et al.

Page 1 of 1

It is certified that error appears in the above-identified patent and that said Letters Patent is hereby corrected as shown below:

In the Claims

Column 18  
Line 7, "...according a second..." should read – "...according to a second..."  
Line 61, "...according a second..." should read – "...according to a second..."

Column 19  
Line 38, "...according a second..." should read – "...according to a second..."

Signed and Sealed this  
Eighth Day of May, 2018

Andrei Iancu  
*Director of the United States Patent and Trademark Office*